(12) United States Patent
Andrzejak et al.

(10) Patent No.: US 7,191,107 B2
(45) Date of Patent: Mar. 13, 2007

(54) METHOD OF DETERMINING VALUE CHANGE FOR PLACEMENT VARIABLE

(75) Inventors: Artur Andrzejak, Berlin (DE); Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 636 days.

(21) Appl. No.: 10/627,274

(22) Filed: Jul. 25, 2003

(65) Prior Publication Data

US 2005/0021583 A1    Jan. 27, 2005

(51) Int. Cl.
  *G06F 17/10* (2006.01)
  *G06F 15/16* (2006.01)
(52) U.S. Cl. ............... 703/2; 709/201; 709/235
(58) Field of Classification Search ............ 703/2; 706/13, 45, 46, 52; 705/7, 8; 707/205; 709/201, 709/226, 235; 718/102; 716/2
See application file for complete search history.

(56) References Cited

U.S. PATENT DOCUMENTS

| | | | | |
|---|---|---|---|---|
| 5,195,172 A * | 3/1993 | Elad et al. | ........... | 706/62 |
| 5,428,712 A * | 6/1995 | Elad et al. | ........... | 706/46 |
| 6,031,984 A | 2/2000 | Walser | ........... | 703/2 |
| 6,321,207 B1 * | 11/2001 | Ye | ........... | 705/8 |
| 6,374,227 B1 * | 4/2002 | Ye | ........... | 705/8 |
| 6,526,420 B2 | 2/2003 | Borowsky et al. | ........... | 707/205 |
| 2003/0216951 A1 * | 11/2003 | Ginis et al. | ........... | 705/8 |
| 2004/0210624 A1 * | 10/2004 | Andrzejak et al. | ........... | 709/201 |
| 2004/0230922 A1 * | 11/2004 | Allen et al. | ........... | 716/2 |
| 2005/0010922 A1 * | 1/2005 | Czajkowski et al. | ........... | 718/102 |

OTHER PUBLICATIONS

Hochbaum, D.S. Solving Integer Programs Over Monotone Inequalities in Three Variables: A Framework for Half Integrality and Good Approximations, European Journal of Operational Research, vol. 140, No. 2, Jul. 2002, pp. 291-321.*
Baldick, R. A Unified Approach to Polynomially solvable Cases of Integer "Non-Separable" Quadratic Optimization, Discrete Applied Mathematics, vol. 61, No. 3, Aug. 1995, pp. 195-212.*

(Continued)

*Primary Examiner*—Russell Frejd
(74) *Attorney, Agent, or Firm*—Richard P. Lange

(57) ABSTRACT

In an embodiment of a method of determining a value changes for a placement variable as part of a local search solution to an integer programming problem that models placement of services of a distributed application onto nodes of a distributed resource infrastructure, an unsatisfied communication constraint is selected. The unsatisfied communication constraint includes a sum of terms where at least some of the terms comprise products of placement variables. Stores are created for allowable changes of value for the variables in the unsatisfied communication constraint. The unsatisfied communication constraint is parsed through by term. For each variable in a term, the stores are updated with a change in the term for each of the allowable changes of the value while maintaining other variables constant. A variable to receive the value change, and possibly a value for the variable, are chosen based upon the store which meets at least one improvement criterion.

42 Claims, 6 Drawing Sheets

OTHER PUBLICATIONS

Andrzejak, A. Memory-Efficient and Fast Enumeration of Global States, IEEE 7th International Conference on Information Visualization, Jul. 2003, pp. 189-193.*

Subhlok et al., J. Integer Programming for Array Subscript Analysis, IEEE Transactions on Parallel and Distributed Systems, vol. 6, No. 6, Jun. 1995, pp. 662-668.*

Wilken et al., K. Optimal Instruction Scheduling Using Integer Programming, ACM SIGPLAN Notices, Proceedings of the ACM SIGPLAN 2000 Conference and Programming Language Design and Implementation, May 2000, pp. 121-133.*

Sven Graupner, Vadim Kotov, Artur Andrzejak, Holger Trinks, Control Architecture for Service Grids in a Federation of Utility Data Centers, HP Labs Technical Report HPL-2002-235, Hewlett-Packard Company, Palo Alto, Aug. 21, 2002. < http://www.hpl.hp.com/techreports/2002/HPL-2002-235.pdf>.

Artur Andrzejak, Sven Graupner, Vadim Kotov, Holger Trinks, Algorithms for Self-Origanization and Adaptive Service Placement in Dynamic Distributed Systems, HP Labs Technical Report, HPL-2002-259, Hewlett-Packard Company, Palo Alto, Sep. 2002. < http://www.hpl.hp.com/techreports/2002/HPL-2002-259.pdf>.

Cipriano Santos, Xiaoyun Zhu, Harlan Crowder, A Mathematical Optimization Approach for Resource Allocation in Large Scale Data Centers, HP Labs Technical Report, HPL-2002-64(R.1), Hewlett-Packard Company, Palo Alto, 2002. < http://www.hpl.hp.com/techreports/2002/HPL-2002-64R1.pdf>.

Parameswaran Ramanathan, Suresh Chalasani, Resource Placement with Multiple Adjacency Constraints in K-ary n-Cubes, IEEE transactions on Parallel & Distributed Systems, May 1995, vol. 6, No. 5, pp. 511-519, IEEE Press, Los Alamitos, 1995.

Sven Graupner, Vadim Kotov, Holger Trinks, Resource-Sharing and Service Deployment in Virtual Data Centers, The 22nd International Conference on Distributed Computing Systems Workshops, Vienna Austria, Jul. 2-5, 2002, pp. 666-671, IEEE Computer Society, Los Alamitos, 2002.

Christodoulous A. Floudas, V. Visweswaran, Quadratic Optomization, Handbook of Global Optimization, pp. 217-269, Kluwer Academic Publishers, Boston, 1995.

Joachim P. Walser, Solving Linear Pseudo-Boolean Constraint Problems with Local Search, Proceedings of the Fourteenth National Conference on Artificial Intelligence and the Ninth Innovative Applications of Artificial Intelligence Conference, Jul. 27-31, 1997, Providence, Rhode Island, pp. 269-274, AAAI Press, Menlo Park, 1997.

Bart Selman, Hector Levesque, David Mitchell, A New Method for Solving Hard Satisfiability Problems, Proceedings of the Tenth National Conference on Artificial Intelligence Jul. 12-16, 1992, San Jose, California, pp. 440-446, AAAI Press, Menlo Park, 1992.

David Abramson, Henry Dang, Mohan Krishnamoorthy, A Comparison of Two Methods for Solving 0-1 Integer Programs Using a General Purpose Simulated Annealing Algorithim, Annals of Operations Research, v. 63, pp. 129-150, Baltzer Science, Amsterdam, Netherlands, 1996.

Joachim Paul Walser, Domain-Independent Local Search for Linear Integer Optomization, Dissertation, Programming Systems Lab, Universität de Saarlandes, Saarbrücken, Germany, Oct. 1998.

Bart Selman, Greedy Local Search in MIT Encyclopedia of the Cognitive Sciences, MIT Press, Cambridge, 1999.

Bart Selman, Henry A. Kautz, Bram Cohen, Local Search Strategies for Satifiabily Testing Presented at the Second DIMACS Challenge on Cliques, Coloring, and Satisfiability, Oct. 11-13, 1993, Piscataway, New Jersey.

Bart Selman, Henry A. Kautz, Bram Cohen, Noise Strategies for Improving Local Search, Proceedings of the Twelfth National Conference on Artificial Intelligence, Aug. 1-4, 1994, Seattle, Washington, pp. 337-343, AAAI Press, Menlo Park, 1994.

* cited by examiner

METHOD OF DETERMINING VALUE CHANGE FOR PLACEMENT VARIABLE

RELATED APPLICATIONS

The following applications disclose related subject matter: U.S. application Ser. No. 10/627,324, filed Jul. 25, 2003, and entitled, "Determining Placement of Distributed Application onto Distributed Resource Infrastructure"; and U.S. application Ser. No. 10/627,883, filed Jul. 25, 2003, and entitled, "Incorporating Constraints and Preferences for Determining Placement of Distributed Application onto Distributed Resource Infrastructure"; the contents of all of which are hereby incorporated by reference.

FIELD OF THE INVENTION

The present invention relates to the field of placing a distributed application onto a distributed resource infrastructure. More particularly, the present invention relates to the field of placing a distributed application onto a distributed resource infrastructure where the distributed application and the distributed resource infrastructure have arbitrary communication topologies.

BACKGROUND OF THE INVENTION

An integer program can be used to model a resource allocation problem in which variables are assigned discrete values. A linear integer program expresses a particular resource allocation problem as a set of linear equations or inequalities. A method of solving a linear integer program employs a local search solution. The local search solution uses a gradient following approach to iteratively improve an initial assignment of values to the variables until a near optimal solution is reached. Each iteration of the local search solution produces a new assignment of values for the variables. Generally, the new assignment of values differs from a previous assignment of values by one value for a particular variable. For the linear integer program, a selection of the variables that follows the gradient is accomplished by evaluating coefficients for the variables in an unsatisfied constraint.

In a traditional integer program, the resource allocation problem is expressed in terms of constraints and an objective. The constraints are equations or inequalities. The objective is an optimization function.

Walser, in U.S. Pat. No. 6,031,984, issued on Feb. 29, 2000, teaches a method of solving a linear integer program using a local search solution technique referred to as a WSAT(OIP) method. A linear program model for the WSAT (OIP) method defines the linear integer program as an overconstrained integer program, where hard constraints correspond to the constraints of the traditional integer program and where a sum of soft constraints corresponds to the objective. The WSAT(OIP) method selects the variables that follow the gradient by evaluating the coefficients for the variables in the unsatisfied constraint.

If the integer program includes polynomial terms of second or higher order (i.e., quadratic or higher order terms), the representation of coefficients of the variables as used in the WSAT(OIP) method are insufficient for an indication of the gradient.

A distributed application includes a plurality of services. Each of the services performs a task or tasks as part of the distributed application. Often the distributed application is placed on a network of computers. The network of computers forms a distributed resource infrastructure where each of the computers forms a node. Performance of the distributed application depends on optimizing a placement of the services onto the nodes.

An existing method uses parameters for individual nodes to determine a placement of the services onto the nodes. Such parameters include processing and storage capabilities of the nodes. Services are placed onto the nodes so that processing and storage requirements of the services on a particular node do not exceed the processing and storage capabilities of the node.

The existing method does not consider relationships among the nodes or among the services in the determination of the placement of the services onto the nodes. Another existing method considers topologies between the services and between the nodes but requires that the topologies be fixed in certain configurations. The other existing method does not determine a placement of the services onto the nodes where an arbitrary topology exists between the nodes or between the services.

SUMMARY OF THE INVENTION

The present invention is a method of determining a value change for a placement variable as part of a local search solution to an integer programming problem that models a placement of services of a distributed application onto nodes of a distributed resource infrastructure. In an embodiment, an unsatisfied communication constraint is selected. Stores are created for allowable changes of value for placement variables in the unsatisfied communication constraint. The unsatisfied communication constraint is parsed through by term. For each variable in a term, the stores are updated with a change in the term for each of the allowable changes of the value while maintaining other variables constant. The value change for the placement variable is chosen based upon the store which meets at least one improvement criterion.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention is a method of determining a value change for a placement variable as part of a local search solution to an integer programming problem. A constraint may include one or more polynomial terms of at least second order (i.e., a quadratic or higher order polynomial term). The local search solution uses a gradient following approach to iteratively improve an initial assignment of values to the variables until a satisfactory solution is reached. Each iteration of the local search solution produces a new assignment of values for the variables. Generally, the new assignment of values differs from a previous assignment of values by one value for a placement variable.

The integer programming problem may be modeled in a number of ways. For example, it may be modeled as a traditional integer programming problem or as an overconstrained integer programming problem. The traditional integer programming problem models a resource allocation problem in terms of constraints and an objective. The overconstrained integer programming problem models the resource allocation problem in terms of hard constraints and soft constraints. The hard constraints correspond to the constraints of the traditional integer programming problem. A sum of the soft constraints of the overconstrained integer programming problem corresponds to the objective of the traditional integer programming problem. The method of the present invention applies to the traditional integer programming problem, the overconstrained integer programming problem, or another integer programming problem where a solver employs the local search solution to solve a problem model that includes the constraint having the polynomial term of at least second order.

Figure 1:
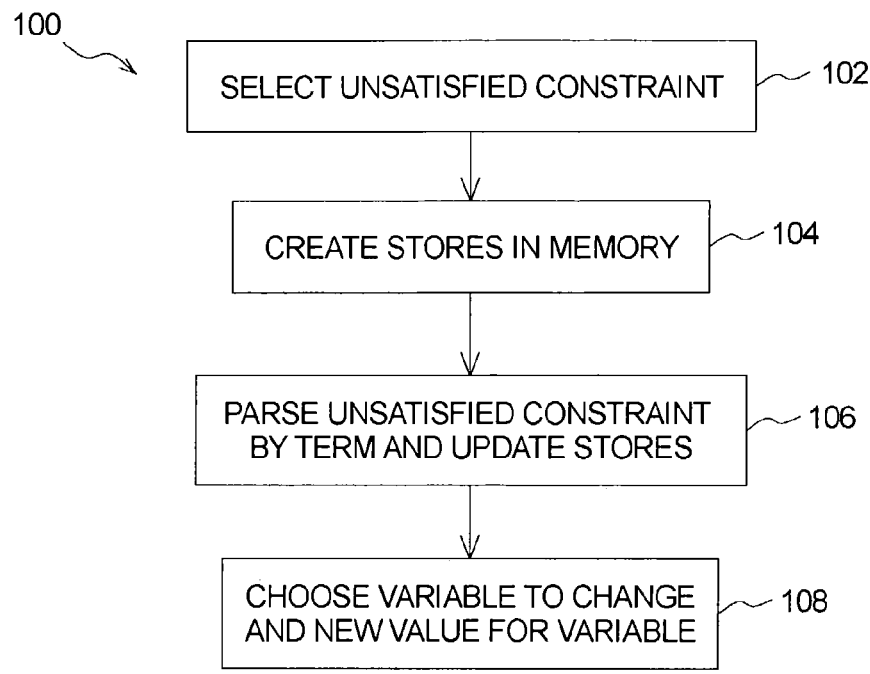
FIG. 1 illustrates a preferred method of determining a variable to receive a value change as a block diagram according to an embodiment of the present invention.

A preferred method of the present invention is illustrated in FIG. 1. The preferred method 100 determines a variable which is to receive a value change and a value for the variable. The preferred method 100 includes first through fourth steps, 102 . . . 108. In the first step 102, an unsatisfied constraint is selected. In the second step 104, stores are created for allowable changes of value for variables in the unsatisfied constraint. The stores are created for each variable in the unsatisfied constraint and for each allowable change of value of the variables. For example, if there are three variables in the unsatisfied constraint and if each variable has one allowable change of value, three of the stores are created.

In the third step 106, the unsatisfied constraint is parsed by term. For each variable in the term and for each allowable change of value of the variable, an associated store is updated with a change in the term while holding other variables constant. In the fourth step 108, the variable that receives the value change and the value for the variable is chosen according to at least one improvement criterion, such as the variable and the value which most improves the unsatisfied constraint.

In the present invention, the variables include Boolean variables, integer variables, and finite discrete value variables. The Boolean variables have only two discrete possible values such as {0, 1}. The integer variables have more than two discrete possible values such as {−5, 0, 5, 10, 20}. The finite discrete value variables include the integer variables and variables having discrete decimal values such as {1.3, 2.5, 8.9}. If a particular variable in the preferred method 100 is a Boolean variable, the allowable change to it is a single value. So in such a situation, the second step 104 would create a single store for the particular variable. Thus, if a Boolean variable is chosen in the fourth step 108, the value for the particular variable is found by flipping the previously assigned value.

If a second particular variable is an integer variable having ten possible values, the second step 104 would create nine stores for the second particular variable. Alternatively, the allowable changes of value in the second step 104 can be limited to a set of values near the previously assigned value for the integer variable. For example, if the integer variable is limited to values closest to the previously assigned value, the second step 104 would create at most two stores for the integer variable. Or for example, if the integer variable is limited to two values immediately less than the previously assigned value and to two values immediately greater than the previously assigned value, the second step 104 would create at most four stores for the integer variable.

An example illustrates the preferred method 100. Given Boolean variables x and y having initial values of x=0 and y=1 and an unsatisfied constraint of $$x^2 + 2xy + y^2 \geq 3,$$

the preferred method 100 begins in the first step 102 by selecting the unsatisfied constraint. The second step 104 then creates a first store for the variable x and a second store for the variable y each having an initial value of 0.

The third step 106 of parsing the unsatisfied constraint by term begins with the term of $x^2$, calculates that the change in the term for flipping the value of x is 1, and updates the first store so that the first store now has the value of 1. Since the variable y does not appear in the term of $x^2$, the value of the second store remains 0. The third step 106 continues with the term of 2xy. First the value of x is flipped while holding y constant. This results in a change of the term of 2xy of 2. The first store is updated with this change, which results in the first store having the value of 3. Next the value of y is flipped while holding x constant. This results in a change of the term of 2xy of 0. The second store may be updated with this change. As a result, the second store still has the value of 0. The third step 106 concludes with the term of $y^2$, calculates the change in the term for flipping the value of y is −1, and updates the second store so that the second store now has the value of −1. Since the variable x does not appear in the term of $y^2$, the value of the first store remains 3.

Thus, the first store concludes with the value of 3 and the second store concludes with the value of −1. This indicates that flipping the value of the first variable improves the unsatisfied constraint since the value of left-hand-side becomes 4 while flipping the value of the second variable does not improve the unsatisfied constraint as this would decrease the value of the left-hand-side to 0. The preferred method 100 then concludes by selecting the variable x as the variable to receive the value change since it is the only variable which can improve the unsatisfied constraint.

Figure 2:
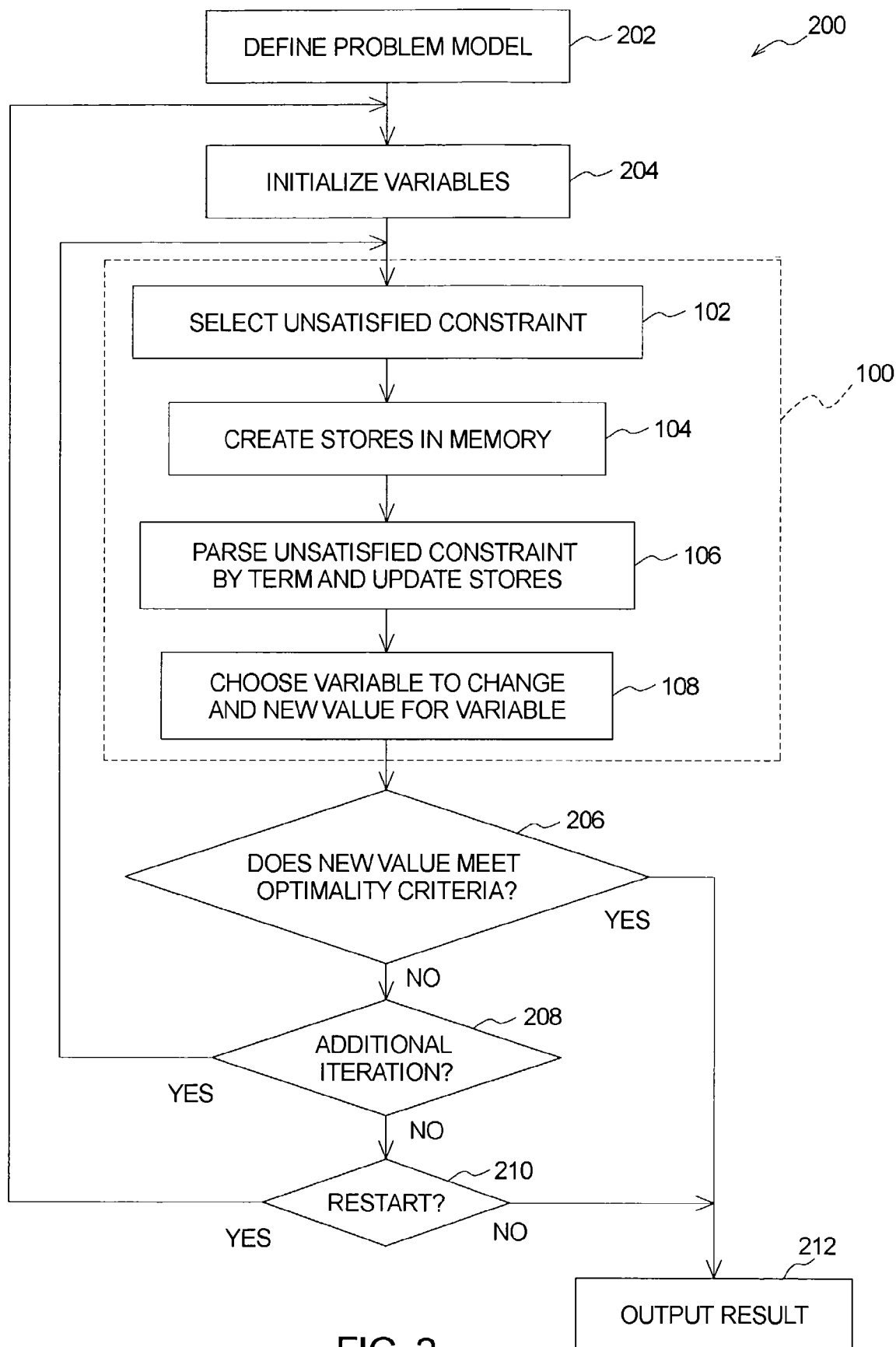
FIG. 2 illustrates a first alternative method as a flow chart according to an embodiment of the present invention, where the first alternative method employs a local search solution to solve an integer programming problem that includes a polynomial term of at least second order.

A first alternative method of the present invention is illustrated in FIG. 2. The first alternative method 200 employs the local search solution to solve an overconstrained integer programming problem. The first alternative method 200 includes the first through fourth steps, 102 . . . 108, of the preferred method 100, as well as fifth through ninth steps, 202 . . . 210. The first alternative method 200 begins with the fifth step 202, which defines a problem model having hard and soft constraints. In the sixth step 204, the variables are randomly assigned initial values. The preferred method 100 then determines the variable to receive the value change and the value for the variable.

In the seventh step 206, the assigned values are compared to optimality criteria to determine whether a solution has been found. The optimality criteria for the overconstrained integer programming problem are no violation of the hard constraints and near optimum solutions for the soft constraints. If the optimality criteria are not met, the first alternative method 200 continues in the eighth step 208 with a determination of whether an additional iteration is to be performed. If so, the first alternative method 200 returns to the preferred method 100 to determine another variable which is to be changed and a value for the variable. If not, a ninth step 210 determines whether to restart the first alternative method 200 by reinitializing the variables. If the optimality criteria are met in the seventh step 206, a final value assignment for the variables is output as a result in a tenth step 212. If the ninth step 210 determines to not restart the first alternative method 200, a "no solution found" message is output in the tenth step 210.

Figure 3:
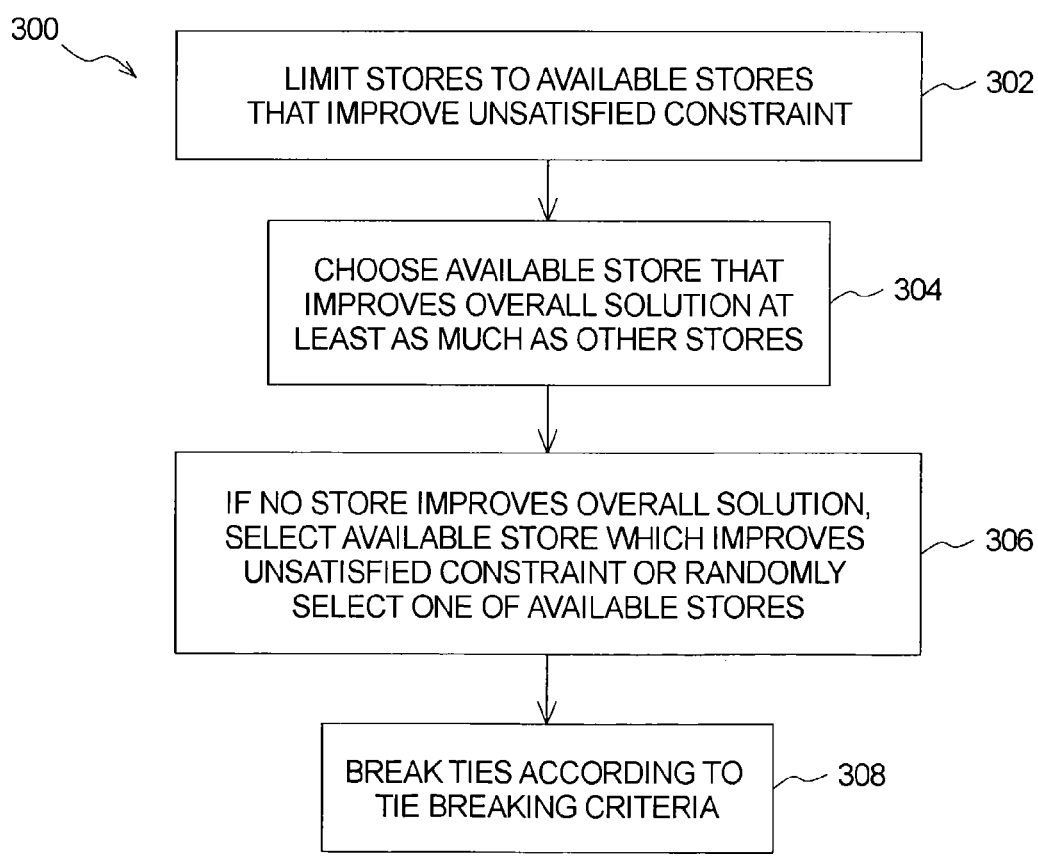
FIG. 3 illustrates an alternative step of choosing a variable to receive a value change according to an embodiment of the present invention.

A second alternative method of the present invention replaces the fourth step 108 in the first alternative method 200 with an alternative fourth step, which is illustrated in FIG. 3. The alternative fourth step 300 includes first through fourth tasks, 302 . . . 308. In the first task 302, the stores are limited to available stores, which include the stores that improve the unsatisfied constraint and the stores that are not "tabu" stores. A tabu store is a store which indicates a variable and a value that was previously selected within a previously selected number of iterations, such as within ten iterations. By not choosing the tabu stores, the local search solution avoids getting stuck at a local optimum in its search for the near-optimum solution. The second task 304 chooses the available store that improves an overall solution at least as much as other available stores. This available store corresponds to the variable to receive the value change and the value for the variable. If no available store improves the overall solution, the third task 306 selects the store from the available stores by applying a probability p to a constraint improvement selection and a probability of (1-p) to a random selection. The constraint improvement selection chooses the variable and the value from the available stores that most improves the unsatisfied constraint. The random selection chooses a randomly selected variable and value from the available stores. In the fourth task 308, ties are broken according to a tie-breaking criterion, such as recency or frequency. Recency chooses the variable and the value based upon which variable and value was selected last longest ago. Frequency chooses the variable and the value based upon which variable and value have been chosen least often.

A fifth alternative method of the present invention modifies the third step 106 (FIG. 1) of the preferred method 100. In the preferred method, the third step 106 parses the unsatisfied constraint by term. For each variable in the term and for each allowable change of value of the variable, the associated store is updated with the change in the term while holding other variables constant. In the fifth alternative method, for each variable in the term that is encountered for a first time in the parsing and for each allowable change of the value of the variable, the associated store is updated with a change in the unsatisfied constraint while holding the other variables constant. Updating the associated store with the change in the term of the preferred method 100 is preferred over updating the change in the unsatisfied constraint of the fifth alternative method because it minimizes term calculations for constraints where the variables appear in only a subset of the terms. For example, for a constraint of six terms and three variables where the three variables each appear in three terms, updating the stores for the change in the terms is accomplished in six term calculations while updating the stores for the change in the unsatisfied constraint is accomplished in eighteen term calculations. Minimizing the term calculations enhances an efficiency of the local search solution since the local search solution is an iterative technique where a total number of term calculations is a product of the term calculations per iteration and a number of iterations.

Figure 4:
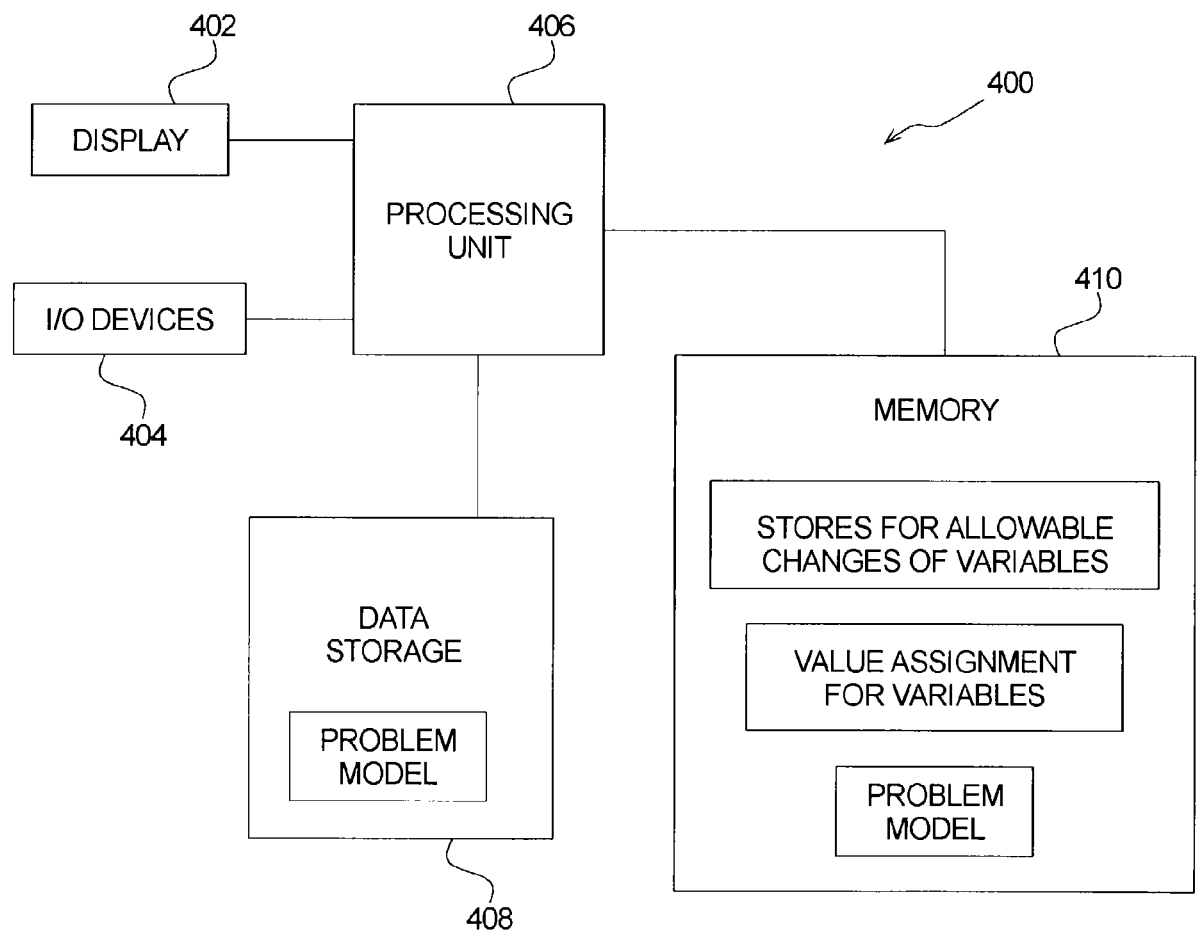
FIG. 4 illustrates a system for determining a variable to receive a value change according to an embodiment of the present invention.

An embodiment of a system for employing the first alternative method of the present invention is illustrated schematically in FIG. 4. The system 400 includes a display 402, input/output devices 404, a processing unit 406, a storage device 408, and a memory 410. The processing unit 406 couples to the display 402, the input/output devices 404, the storage device 408, and the memory 410.

In operation, the processing unit 406 reads the overconstrained integer programming problem into the memory 410. The processing unit 406 then initializes the variables by randomly assigning values to the variables. Next, the processing unit 406 randomly selects the unsatisfied constraint. Following this, the processing unit 406 creates stores in the memory 410 for the allowable changes of the variables in the unsatisfied constraint. The processing unit 406 then parses the unsatisfied constraint by term updating individual stores associated with the term while maintaining other variables constant. Following this, the processing unit 406 chooses the variable to receive the value change and the value for the variable according to the improvement criterion. The processing unit 406 then determines whether the optimality condition has been met and, if not, determines whether to perform more iterations or whether the method should be restarted.

In an embodiment of the present invention, computer code resides on a computer readable memory, which is read into the system 400 by one of the input/output devices 404. Alternatively, the computer readable memory comprises the storage device 408 or the memory 410. The computer code provides instructions for the processing unit 406 to perform a method of the present invention. The computer readable memory is selected from a group including a disk, a tape, a memory chip, or other computer readable memory.

An exemplary set of constraints is provided in Table 1. The exemplary set of constraints includes first, second, and third constraints. The first and second constraints are categorized as hard constraints while the third constraint is categorized as a soft constraint.

TABLE 1

| Constraint No. | Constraint | Type of Constraint |
| --- | --- | --- |
| 1 | $x_1^2 + 2x_1x_2 + x_2^2 \geq 3$ | Hard |
| 2 | $x_2^2 - 2x_2x_3 + x_3^2 \geq 15$ | Hard |
| 3 | $x_1^2 + x_2^2 + x_3 \leq 11$ | Soft |

An exemplary set of variables is provided in Table 2. The exemplary set of variables includes first and second Boolean variables, $x_1$ and $x_2$, and an integer variable $x_3$.

TABLE 2

| Variable | Type of Variable | Possible Values |
| --- | --- | --- |
| $x_1$ | Boolean | 0, 1 |
| $x_2$ | Boolean | 0, 1 |
| $x_3$ | Integer | 0, 5, 10, 20 |

Applying the second alternative method to the exemplary constraints and the exemplary variables begins by randomly initializing the variables, for example $x_1=0$, $x_2=0$, and $x_3=20$. The step of selecting the unsatisfied constraint determines that the first and third constraints are unsatisfied constraints and randomly selects the first constraint. The step of creating stores in memory creates a first store for the first Boolean variable $x_1$ and creates a second store for the second Boolean variable $x_2$. The first and second stores are given initial values of 0.

The step of parsing through the first constraint by term begins with the term $(x_1)^2$, determines that the change in the term due to flipping $x_1=0$ with $x_1=1$ changes the value of the term by 1, and updates the first store with this change so that the first store now has a value of 1. The second store maintains the value of 0 since the second Boolean variable $x_2$ does not appear in the first term. The step of parsing through the first constraint by term continues with the term of $2x_1x_2$, determines that the change in the term due to flipping $x_1=0$ with $x_1=1$ changes the value of the term by 0, determines that the change in the term due to flipping $x_2=0$ with $x_2=1$ changes the value of the term by 0, and adds these changes to the first and second stores so that the first store has the value of 1 and the second store has the value of 0. The step of parsing through the first constraint by term concludes with the term of $(x_2)^2$, determines that the change in the term for flipping $x_2=0$ with $x_2=1$ changes the value of the term by 1, and adds this change to the second store so that the first store maintains the value of 1 and the second store concludes with the value of 1. Thus, flipping the value of either the first or second Boolean variables, $x_1$ or $x_2$, improves the unsatisfied constraint.

The step of choosing the variable and the value of the variable according to the second alternative method begins with the first task 302 (FIG. 3) of identifying the first and second Boolean variable, $x_1$ and $x_2$, as available variables. It continues with a determination of whether the overall solution is improved and, if so, which of the available variables improves the overall solution at least as much as other available variables. To do this, a determination is first made of a sum of violations of the constraints with the assigned values of $x_1=0$, $x_2=0$, and $x_3=20$. The first constraint has a left hand side value of 0 with these values and, thus, a violation of the first constraint is 3. The second constraint has a left hand side value of 400 and, thus a violation of the second constraint is 0 since a hard constraint cannot have a violation less than 0. The third constraint has a left hand side value of 20 and, thus, a violation of the third constraint is 9. Note that soft constraints can have a negative violation since, for the soft constraints, it is desirable to improve a solution beyond a given fixed value for the soft constraint. Thus, the sum of the violation of the constraints with the assigned values is 12.

Similarly, the sum of the violations of the constraints with the first Boolean variable flipped is determined to be 12 and the sum of the violations of the constraints with the second Boolean variable flipped is determined to be 12. Therefore, the second task 304 (FIG. 3) of choosing the available store that improves the overall solution at least as much as the other available stores determines that flipping neither the first nor second Boolean variable improves the overall solution. The third task 306 (FIG. 3) then determines that both the first and second Boolean variables improve the first constraint at least as much as the other and randomly selects the first Boolean variable to flip so that now $x_1=1$. Since the first and third constraints remain unsatisfied constraints, the seventh step 206 (FIG. 2) of determining whether the assigned values of $x_1=1$, $x_2=0$, and $x_3=20$ meets the optimality criteria determines that they do not. The eighth step 208 then determines that an additional iteration is to be performed.

The method continues with selection of the third constraint as the unsatisfied constraint, determination that the variable to receive the value change is the integer variable, and determination that the value for the variable is 5. In this iteration the sum of the violations the constraints is −3. Also, since the first constraint continues to be unsatisfied, the optimality condition is not met in the seventh step 206. The eighth step 208 then determines that an additional iteration is to be performed. In a final iteration, the first constraint is selected since it is the only remaining unsatisfied constraint. The final iteration determines that the second Boolean variable, $x_2$, is to be flipped and outputs a result of $x_1=1$, $x_2=1$, and $x_3=5$.

It will be readily apparent to one skilled in the art that application of the second alternative method to the exemplary constraints and variables is meant to illustrate an embodiment of the present invention and does not represent a typical application. A more typical application would involve many more constraints and many more variables. The more typical application is only limited in size by processing speed and power of a system implementing the solution and by a desired time for determining a result.

Figure 5:
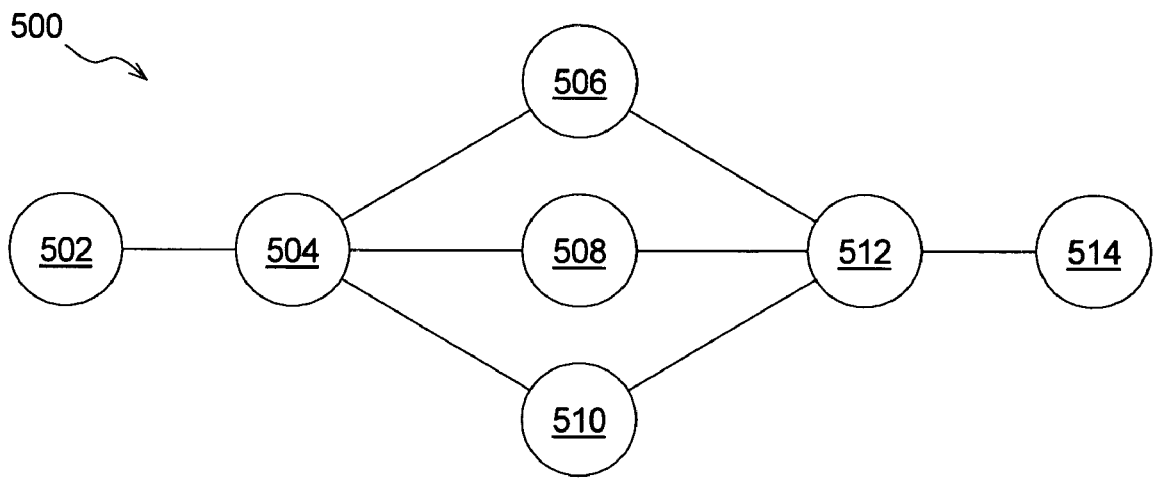
FIG. 5 schematically illustrates an exemplary distributed application according to an embodiment of the present invention.

An embodiment of an exemplary distributed application is illustrated schematically in FIG. 5. The distributed application 500 comprises a firewall 502, a local buffer 504, first, second, and third web servers, 506, 508, and 510, an application server 512, and a database 514, each of which forms a service. The firewall 502 is coupled to the local buffer 504. Each of the first, second, and third web servers, 506, 508, and 510, couples the local buffer 504 to the application server 512. The application server 512 is coupled to the database 514. In operation, the distributed application embodiment 500 provides web access to users who provide and obtain information from the database 514.

Figure 6:
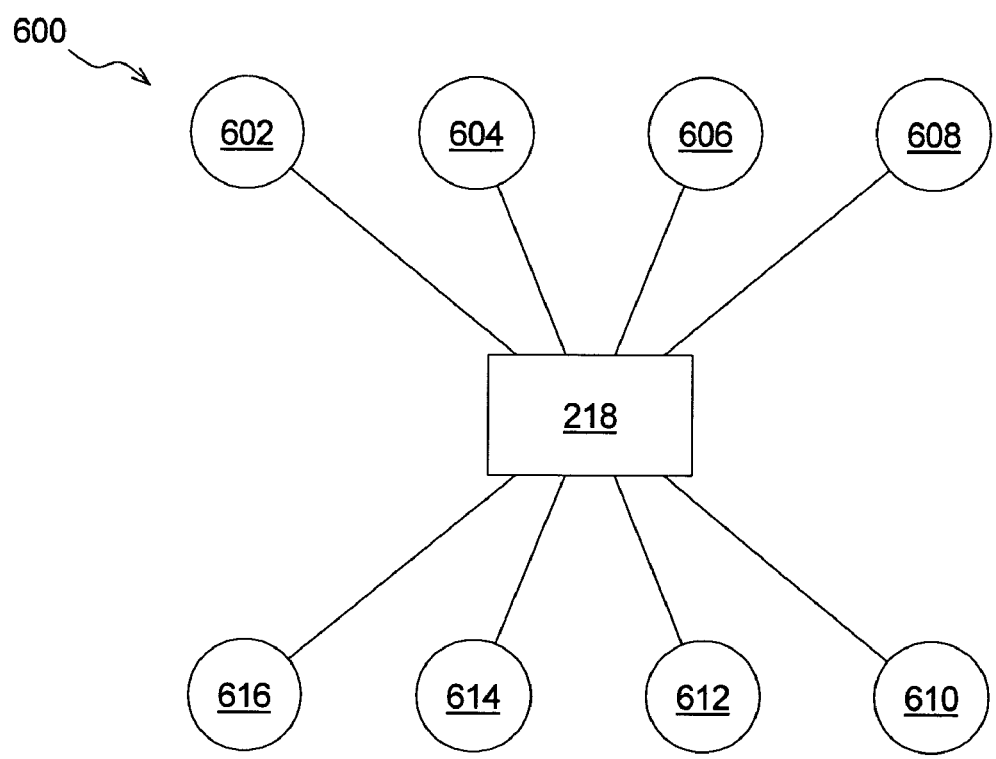
FIG. 6 schematically illustrates an exemplary distributed resource infrastructure according to an embodiment of the present invention.

An embodiment of an exemplary distributed resource infrastructure is illustrated schematically in FIG. 6. The distributed resource infrastructure 600 comprises first through eighth nodes, 602 . . . 616, and a switch 618. The switch 618 couples each of the first through eighth nodes, 602 . . . 616, to remaining nodes of the first through eighth nodes, 602 . . . 616. The determination of the placement of the distributed application 500 onto the distributed resource infrastructure 600 is accomplished according to an objective such as minimizing network traffic, minimizing latency in order to reduce response time, or balancing a load on the nodes.

Figure 7:
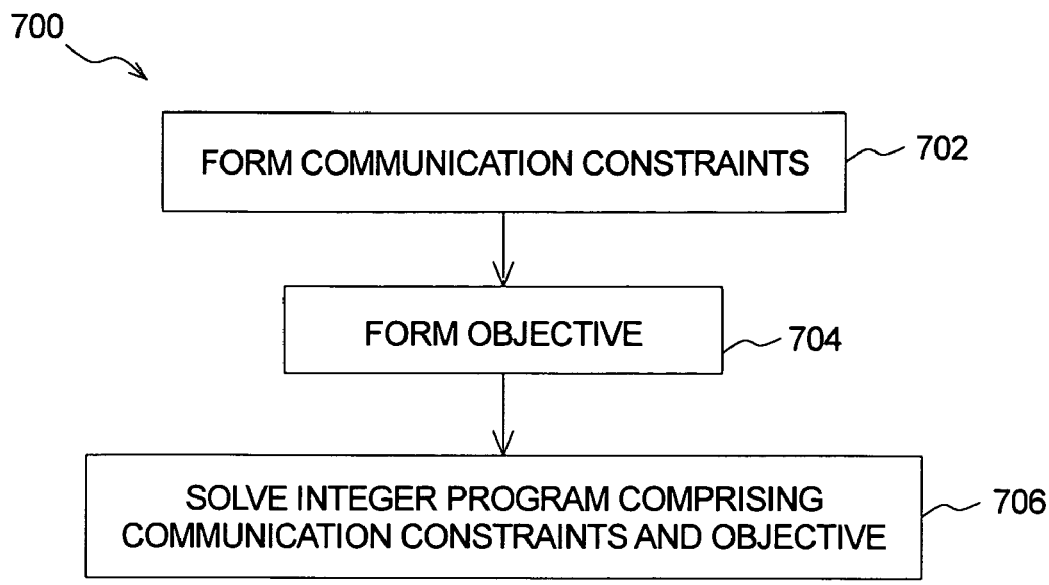
FIG. 7 illustrates a method of determining a placement of services of a distributed application onto a distributed resource infrastructure as a block diagram according to an embodiment of the present invention.

An embodiment of a method of determining placement of services of a distributed application onto nodes of a distributed resource infrastructure of the present invention is illustrated as a block diagram in FIG. 7. The method 700 comprises first through third steps, 702 . . . 706. The first step 702 forms communication constraints, which ensure that transport demands between node pairs do not exceed transport capacities between the node pairs. Each of the communication constraints is made up of a sum of terms. Each of the terms comprises a product of a first placement variable, a second placement variable, and the transport demand between the services associated with the first and second placement variables. The second step 704 forms the objective. In the third step 706, a local search solution is employed to solve an integer program comprising the communication constraints and the objective, which provides the placement of the service onto the nodes.

Figure 8:
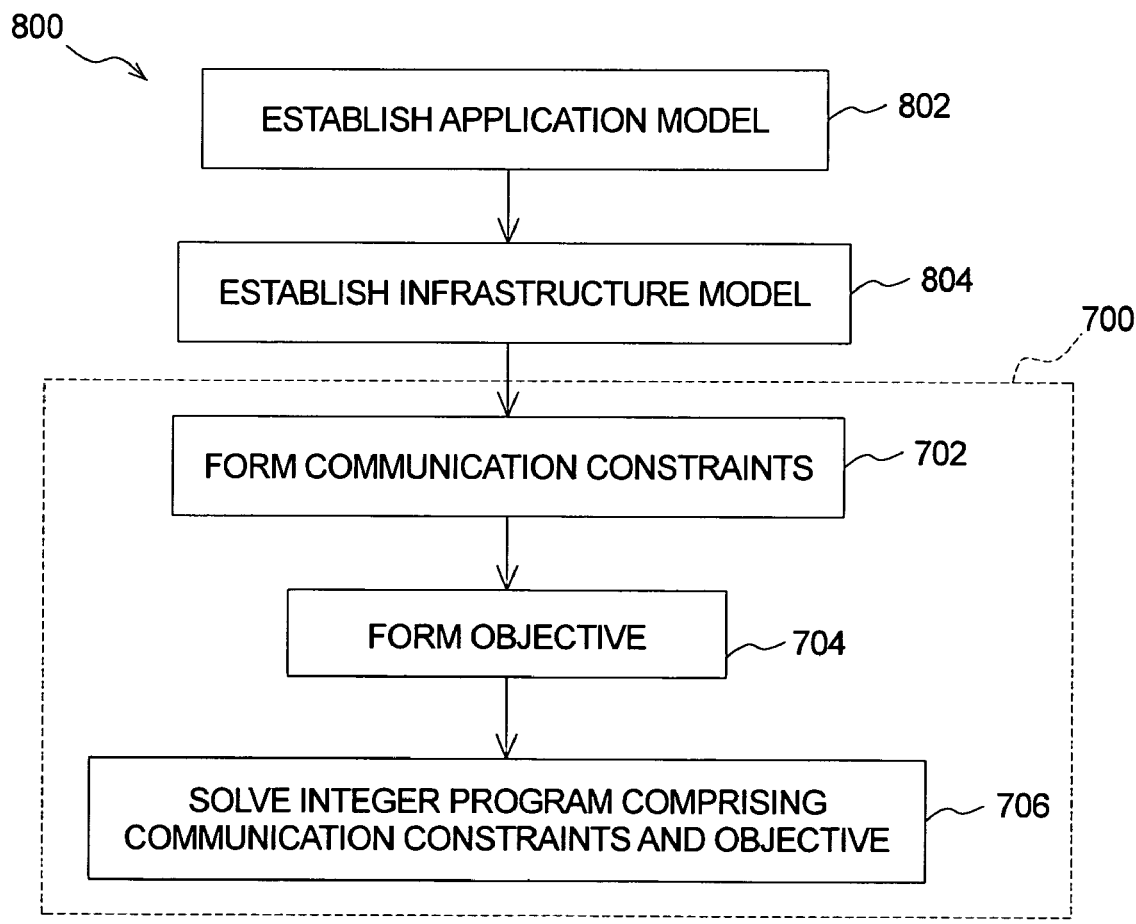
FIG. 8 illustrates an alternative method of determining placement of services of a distributed application onto a distributed resource infrastructure as a block diagram according to an embodiment of the present invention.

A first alternative method of determining placement of services of a distributed application onto nodes of a distributed resource infrastructure of the present invention is illustrated as a block diagram in FIG. 8. The first alternative method 800 adds fourth and fifth steps to the preferred method 700. The fourth step 802 establishes an application model, which comprise the transport demands between the services. The fifth step 804 establishes an infrastructure model, which comprises the transport capacities between the nodes. The application model and the infrastructure model provide the transport demands and capacities to the preferred method 700.

Figure 9:
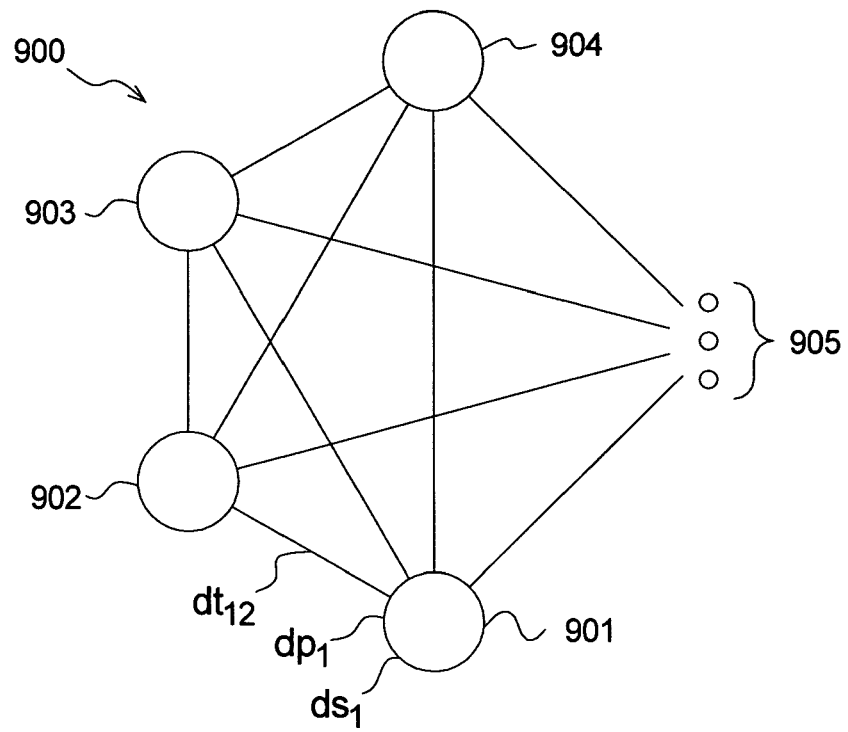
FIG. 9 schematically illustrates an exemplary distributed application according to an embodiment of the present invention.

Another embodiment of an exemplary distributed application is illustrated schematically in FIG. 9. The distributed application 900 comprises first through fourth services, 901 . . . 904, and fifth through Sth services, 905. Mathematically, the first through Sth services, 901 . . . 905, are expressed as $s \in \{1, 2, 3, ..., S\}$. Each pair of the services has an associated transport demand. For example, a first transport demand $dt_{12}$ represents communication traffic between the first and second services, 901 and 902. A transport demand matrix Dt lists the transport demands between the first through Sth services, 901 . . . 905, as follows.

$$Dt = \begin{pmatrix} - & dt_{12} & dt_{13} & \cdots & dt_{1S} \\ dt_{21} & - & dt_{23} & \cdots & dt_{2S} \\ dt_{31} & dt_{32} & - & \cdots & dt_{3S} \\ \cdots & \cdots & \cdots & - & \cdots \\ dt_{S1} & dt_{S3} & dt_{S3} & \cdots & - \end{pmatrix}$$

Since services do not communicate with themselves over a network, the transport demands along a matrix diagonal have no values. Further, depending upon a particular implementation it may be sufficient to characterize the transport demands without reference to direction in which case the transport demands below the matrix diagonal would also have no values.

Each of the first through Sth services, 901 . . . 905, of the alternative distributed application 900 is also characterized with a processing demand and a storage demand. For example, the first service 901 has a first processing demand $dp_1$ and a first storage demand $ds_1$. A processing demand vector Dp and a storage demand vector $D_s$ list the processing demands and the storage demands of the first through Sth servers, 901 . . . 905, as follows.

$$Dp = \begin{pmatrix} dp_1 \\ dp_2 \\ dp_3 \\ \cdots \\ dp_S \end{pmatrix} \quad Ds = \begin{pmatrix} ds_1 \\ ds_2 \\ ds_3 \\ \cdots \\ ds_S \end{pmatrix}$$

Figure 10:
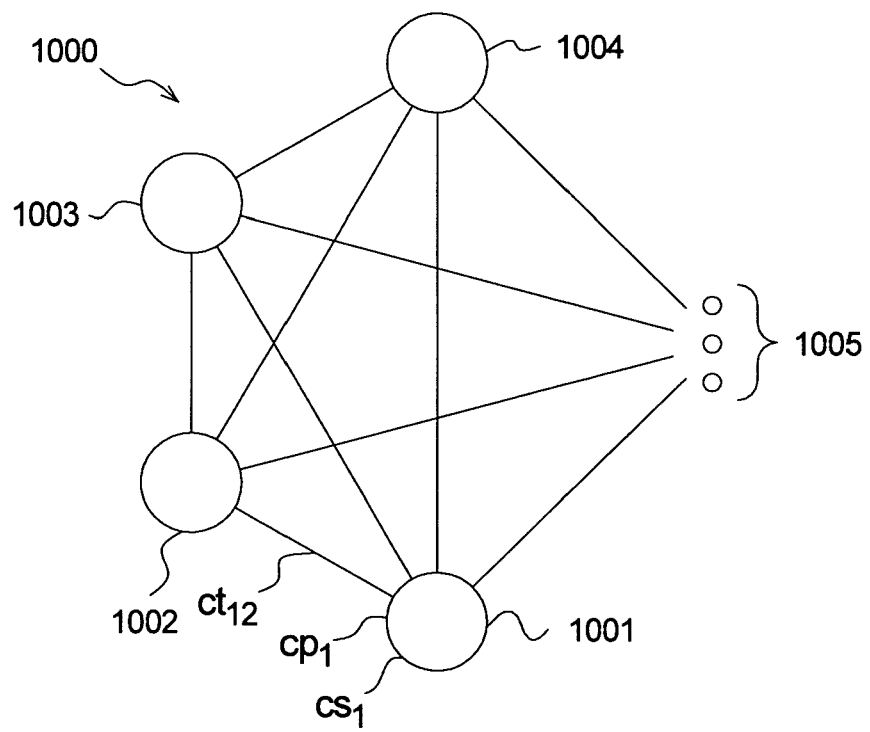
FIG. 10 schematically illustrates an exemplary distributed resource infrastructure according to an embodiment of the present invention.

Another embodiment of an exemplary distributed resource infrastructure is illustrated schematically in FIG. 10. The distributed resource infrastructure 1000 comprises first through fourth nodes, 1001 . . . 1004, and fifth through Nth nodes, 1005. Mathematically, the fist through Nth nodes are expressed as $n \in \{1, 2, 3, ..., N\}$. Each pair of the nodes has an associated transport capacity. For example, a first transport capacity $ct_{12}$ represents communication bandwidth between the first and second nodes, 1001 and 1002. A transport capacity matrix Ct lists the transport capacities between the first through Nth nodes, 1001 . . . 1005, as follows.

$$Ct = \begin{pmatrix} - & ct_{12} & ct_{13} & \cdots & ct_{1N} \\ ct_{21} & - & ct_{23} & \cdots & ct_{2N} \\ ct_{31} & ct_{32} & - & \cdots & dt_{3N} \\ \cdots & \cdots & \cdots & - & \cdots \\ ct_{N1} & ct_{N3} & ct_{N3} & \cdots & - \end{pmatrix}$$

Since nodes do not communicate with themselves over a network, the transport capacities along a matrix diagonal have no values. Further, depending upon a particular implementation it may be sufficient to characterize the transport capacities without reference to direction in which case the transport capacities below the matrix diagonal would also have no values.

Each of the first through Nth nodes, 1001 . . . 1005, of the alternative distributed resource infrastructure 1000 is also characterized with a processing capacity and a storage capacity. For example, the first node 1001 has a first processing capacity $cp_1$ and a first storage capacity $cs_1$. A processing capacity vector Cp and a storage capacity vector Cs list the processing capacities and the storage capacities of the first through Nth nodes, 1001 . . . 1005, as follows.

$$Cp = \begin{pmatrix} cp_1 \\ cp_2 \\ cp_3 \\ \cdots \\ cp_N \end{pmatrix} \quad Cs = \begin{pmatrix} cs_1 \\ cs_2 \\ cs_3 \\ \cdots \\ cs_N \end{pmatrix}$$

In some situations, the distributed application under consideration operates solely on the distributed resource infrastructure. In this situation, the transport, processing, and storage capacities represent absolute capacities for the nodes. In other situations, the distributed application is one of a plurality of distributed applications operating on the distributed resource infrastructure. In these other situations, the transport, processing, and storage capacities represent available capacities for the nodes.

In the alternative distributed application embodiment 900 and the alternative distributed resource infrastructure embodiment 1000, the transport and storage demands, Dt and Ds, as well as the transport and storage capacity, Ct and Cs, are normalized according to standard parameters of data per unit time and data, respectively. In an embodiment of the present invention, the processing demand Dp and the processing capacity Cp are normalized according to a processing criterion. Preferably, the processing criterion is a transaction speed especially when the distributed application forms a database application. Alternatively, the processing criterion is an algorithm speed. In another embodiment of the present invention, various processors are listed in a look-up table with associated processing capacities that have been normalized by the processing criterion. In this embodiment, a system implementing the present invention would go to the look-up table to find the processing capacity for a particular node when needed.

Applying the method 800 (FIG. 8) to the distributed application 900 and the distributed resource infrastructure 1000 begins with the fourth and fifth steps, 802 and 804, in which the transport demand and capacity matrices, Dt and Ct, are established. The first step 702 then forms the communication constraints in first and second tasks. The first task forms placement variables, which according to an embodiment of the present invention are Boolean variables. In a matrix notation, the placement variables are given by a placement variable matrix X where rows represent the services and columns represent the nodes. The placement variable matrix X is as follows.

$$X = \begin{pmatrix} x_{11} & x_{12} & \cdots & x_{1N} \\ x_{21} & x_{22} & \cdots & x_{2N} \\ \cdots & \cdots & \cdots & \cdots \\ x_{S1} & x_{S2} & \cdots & x_{SN} \end{pmatrix}$$

The second task forms the communication constraints according to a communication constraint equation, which is given as follows.

$$\sum_k \sum_i x_{ij} x_{kl} dt_{ik} = ct_{jl}$$

The second step 704 forms the objective, which according to an embodiment of the present invention minimizes communication traffic between the nodes and balances processing loads on the nodes. The latter is accomplished by minimizing the mathematical variance of the processing loads. The objective is given as follows.

$$\text{Minimize}(1-\alpha)\frac{1}{A}\sum_l \sum_j Prox_{lj} \sum_k \sum_i x_{ij} x_{kl} dt_{ik} +$$
$$\alpha \left\{ \sum_j \left(\frac{1}{cp_i}\sum_i x_{ij}dp_i\right)^2 - \frac{1}{N}\sum_l \left(\frac{1}{cp_l}\sum_k x_{kl}dp_k\right)^2 \right\}$$

for where $\alpha$ provides a relative weight between minimizing the communication traffic and balancing the processing loads, A provides a normalizing factor, $Prox_{lj}$ accounts for distances between the nodes, and N is a number of the nodes. The third step 706 then employs the local search solution to solve the integer program comprising the communication constraints and the objective.

Since the communication constraints account for a distributed application topology according to the transport demands and for a distributed resource infrastructure topology according to the transport capacities, the present invention allows arbitrary topologies for both the distributed application and the distributed resource infrastructure. This allows the present invention to be used for determining placement of applications onto infrastructures in wide variety of situations. Examples of such situations include placing an application onto nodes in a data center and placing a different application onto nodes in geographically distributed data centers.

Another embodiment of a method of determining placement of services of a distributed application onto nodes of a distributed resource infrastructure of the present invention adds processing constraints to the integer program. The processing constraints ensure that a sum of the processing demands for a specific node does not exceed the processing capacity of the specific node. In an embodiment of the present invention, the processing constraints are formed according to a processing constraint equation, which is given as follows.

$$\sum_i x_{ij}dp_i \le cp_j$$

Another embodiment of a method of determining placement of services of a distributed application onto nodes of a distributed resource infrastructure of the present invention adds storage constraints to the integer program. The storage constraints ensure that a sum of the storage demands for a specific node does not exceed the storage capacity of the specific node. In an embodiment of the present invention, the storage constraints are formed according to a storage constraint equation, which is given as follows.

$$\sum_i x_{ij}ds_i \le cs_j$$

Another embodiment of a method of determining placement of services of a distributed application onto nodes of a distributed resource infrastructure of the present invention adds placement constraints to the integer program. The placement constraints ensure that each of the services is placed on one and only one of the nodes. In an embodiment of the present invention, the placement constraints are formed according to a placement constraint equation, which is given as follows.

$$\sum_j x_{ij} = 1$$

Another embodiment of a method of determining placement of services of a distributed application onto nodes of a distributed resource infrastructure of the present invention recognizes that, once the services have been placed onto the nodes, a rearrangement of the services onto the nodes comes at a cost. In the fifth alternative method, reassignment penalties are assessed when a service placement differs from an existing assignment of the service. According to an embodiment of the fifth alternative method, a second objective is added to the integer program. The second objective seeks to minimize the reassignment penalties.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of determining a value change for a placement variable as part of a local search solution to an integer programming problem that models placement of services of a distributed application onto nodes of a distributed resource infrastructure comprising the steps of:
    selecting an unsatisfied communication constraint that includes a sum of terms, at least some of the terms comprising products of placement variables;
    creating stores for allowable changes of value for the placement variables in the unsatisfied communication constraint;
    parsing through the unsatisfied communication constraint by term and for each placement variable in the term updating the stores with a change in the term for each of the allowable changes of the value while maintaining other placement variables constant; and
    choosing the placement variable to receive the value change and the value for the placement variable based upon the store which meets an improvement criterion.

2. The method of claim 1 wherein at least some of the placement variables are binary variables.

3. The method of claim 2 wherein all of the placement variables are binary variables.

4. The method of claim 3 wherein each of the placement variables is associated with no more than a single store.

5. The method of claim 3 wherein the step of choosing the placement variable to receive the value change and the value for the placement variable comprises choosing the placement variables to receive the value change based upon which of the stores meets the improvement criterion and flipping the value of the placement variable selected.

6. The method of claim 1 wherein the allowable values for at least one of the placement variables comprise integer values.

7. The method of claim 6 wherein the integer values comprise a subset of possible integer values.

8. The method of claim 7 wherein the subset of the possible integer values comprises the integer values near an existing value for the placement variable.

9. The method of claim 1 wherein the allowable changes in the placement variables do not include tabu values.

10. The method of claim 1 wherein the improvement criterion comprises the store which improves the unsatisfied constraint and which improves an overall solution at least as much as other stores.

11. The method of claim 1 wherein the improvement criterion comprises the store which is not tabu, which improves the unsatisfied constraint, and which improves an overall solution at least as much as other stores which are not tabu.

12. The method of claim 1 further comprising the step of determining that none of the stores improve an overall solution.

13. The method of claim 12 wherein the improvement criterion comprises the store which improves the unsatisfied constraint at least as much as other stores.

14. The method of claim 12 wherein the improvement criterion comprises a random selection of one of the stores which improves the unsatisfied constraint.

15. The method of claim 1 wherein the step of choosing the placement variable to receive the value change and the value for the placement variable is based upon the store which meets improvement criteria.

16. The method of claim 1 further comprising the steps of:
    defining a problem model which comprises constraints, wherein the constraints comprise hard constraints and a soft constraint;
    randomly initializing values for the placement variables, thereby forming assigned values for the placement variables, wherein the assigned values are applied to the constraints to determine unsatisfied communication constraints;
    changing the value of the placement variable according to the improvement criterion, thereby modifying the assigned values to form new assigned values; and
    comparing the constraints to optimality criteria and if the optimality criteria are met, outputting the new assigned values as a near optimum solution.

17. The method of claim 16 wherein, if the optimality criteria are not met, further comprising determining whether to perform an additional iteration and if so, returning to the step of changing the value of the placement variable, wherein the new assigned values become the assigned values.

18. The method of claim 17 wherein, if another iteration is not to be performed, further comprising determining whether to reinitialize the placement variables and if so, returning to the step of randomly initializing the values for the placement variables.

19. The method of claim 18 wherein, if the placement variables are not to be reinitialized, outputting a no solution found message.

20. A method of determining a value change for a binary placement variable as part of a solution to an integer programming problem that models placement of services of a distributed application onto nodes of a distributed resource infrastructure comprising the steps of:
    selecting an unsatisfied communication constraint that includes a sum of terms, at least some of the terms comprising products of binary placement variables;
    creating a store for each binary placement variable in the unsatisfied communication constraint;
    parsing through the unsatisfied communication constraint by term and for each binary placement variable in the term updating the store for the binary placement variable with a change in the term due to flipping a value of the binary placement variable while maintaining other variables constant; and
    choosing the binary placement variable to receive the value change based upon the store which meets an improvement criterion.

21. A method of determining a value change for a placement variable as part of a local search solution to an integer programming problem that models placement of services of a distributed application onto nodes of a distributed resource infrastructure comprising the steps of:
    selecting an unsatisfied communication constraint that includes a sum of terms, at least some of the terms comprising products of placement variables;
    creating stores for allowable changes of value for the placement variables in the unsatisfied communication constraint;
    parsing through the unsatisfied communication constraint by term and for each placement variable in the term which is encountered for a first time updating the stores with a change in the unsatisfied communication constraint for each of the allowable changes of the value while maintaining other variables constant; and
    choosing the placement variable to receive the value change and the value for the placement variable based upon the store which meets an improvement criterion.

22. A computer readable memory comprising computer code for implementing a method of determining a value change for a variable as part of a solution to an integer programming problem, the method comprising the steps of:

selecting an unsatisfied constraint that includes a sum of terms, at least some of the terms comprising products of variables;

creating stores in memory for allowable changes of value for the variables in the unsatisfied constraint;

parsing through the unsatisfied constraint by term and for each variable in the term updating the stores with a change in the term for each of the allowable changes of the value while maintaining other variables constant; and choosing the variable to receive the value change and the value for the variable based upon the store which meets an improvement criterion.

23. The computer readable memory of claim 22 wherein at least some of the variables are binary variables.

24. The computer readable memory of claim 23 wherein all of the variables are binary variables.

25. The computer readable memory of claim 24 wherein each of the variables is associated with no more than a single store.

26. The computer readable memory of claim 25 wherein the step of choosing the variable to receive the value change and the value for the variable comprises choosing the variable to receive the value change based upon which of the stores meets the improvement criterion and flipping the value of the variable selected.

27. The computer readable memory of claim 22 wherein the allowable values for at least one of the variables comprise integer values.

28. The computer readable memory of claim 27 wherein the integer values comprise a subset of possible integer values.

29. The computer readable memory of claim 28 wherein the subset of the possible integer values comprises the integer values near an existing value for the variable.

30. The computer readable memory of claim 22 wherein the allowable changes in the variables do not include tabu values.

31. The computer readable memory of claim 22 wherein the improvement criterion comprises the store which improves the unsatisfied constraint and improves an overall solution at least as much as other stores.

32. The computer readable memory of claim 22 wherein the improvement criterion comprises the store which is not tabu, which improves the unsatisfied constraint, and which improves an overall solution at least as much as other stores which are not tabu.

33. The computer readable memory of claim 22 further comprising the step of determining that none of the stores improve an overall solution.

34. The computer readable memory of claim 33 wherein the improvement criterion comprises the store which improves the unsatisfied constraint at least as much as other stores.

35. The computer readable memory of claim 33 wherein the improvement criterion comprises a random selection of one of the stores which improves the unsatisfied constraint.

36. The computer readable memory of claim 22 wherein the step of choosing the variable to receive the value change and the value for the variable is based upon the store which meets improvement criteria.

37. The computer readable memory of claim 22 further comprising the steps of:

defining a problem model which comprises constraints, wherein the constraints comprise hard constraints and a soft constraint;

randomly initializing values for the variables, thereby forming assigned values for the variables, wherein the assigned values are applied to the constraints to determine unsatisfied constraints;

changing the value of the variable according to the improvement criterion, thereby modifying the assigned values to form new assigned values;

comparing the constraints to optimality criteria and if the optimality criteria are met, outputting the new assigned values as a near optimum solution.

38. The computer readable memory of claim 37 wherein, if the optimality criteria are not met, further comprising determining whether to perform an additional iteration and if so, returning to the step of changing the value of the variable, wherein the new assigned values become the assigned values.

39. The computer readable memory of claim 38 wherein, if another iteration is not to be performed, further comprising determining whether to reinitialize the variables and if so, returning to the step of randomly initializing the values for the variables.

40. The computer readable memory of claim 39 wherein, if the variables are not to be reinitialized, outputting a no solution found message.

41. A computer readable memory comprising computer code for implementing a method of determining a value change for a binary variable as part of a solution to an integer programming problem, the method comprising the steps of:

selecting an unsatisfied constraint that includes a sum of terms, at least some of the terms comprising products of binary variables;

creating a store in memory for each binary variable in the unsatisfied constraint;

parsing through the unsatisfied constraint by term and for each binary variable in the term updating the store for the binary variable with a change in the term due to flipping a value of the binary variable while maintaining other variables constant; and choosing the binary variable to receive the value change based upon the store which meets an improvement criterion.

42. A computer readable memory comprising computer code for implementing a method of determining a value change for a variable as part of a solution to an integer programming problem, the method comprising the steps of:

selecting an unsatisfied communication constraint that includes a sum of terms, at least some of the terms comprising products of variables;

creating stores in memory for allowable changes of value for the variables in the unsatisfied constraint;

parsing through the unsatisfied constraint by term and for each variable in the term which is encountered for a first time updating the stores with a change in the unsatisfied constraint for each of the allowable changes of the value while maintaining other variables constant; and choosing the variable to receive the value change and the value for the variable based upon the store which meets an improvement criterion.

* * * * *

UNITED STATES PATENT AND TRADEMARK OFFICE
CERTIFICATE OF CORRECTION

PATENT NO. : 7,191,107 B2
APPLICATION NO. : 10/627274
DATED : March 13, 2007
INVENTOR(S) : Artur Andrzejak et al.

It is certified that error appears in the above-identified patent and that said Letters Patent is hereby corrected as shown below:

On the title page, item (57), under "Abstract", in column 2, line 2, delete "changes" and insert -- change --, therefor.

In column 2, line 37, after "improvement criterion." delete "These and other aspects of the present invention are described in more detail herein.".

In column 11, line 63, delete "$Prox_{1j}$" and insert -- $Prox_{lj}$ --, therefor.

Signed and Sealed this

Twenty-eighth Day of April, 2009

JOHN DOLL
*Acting Director of the United States Patent and Trademark Office*